June 10, 1947. R. RUEGG 2,422,131
COMBINED AIR HEATER FOR HOT AIR TURBINE AND BLAST FURNACE
Filed March 9, 1944

Inventor
Rudolf Ruegg
By
Attorneys

Patented June 10, 1947

2,422,131

UNITED STATES PATENT OFFICE 2,422,131

COMBINED AIR HEATER FOR HOT-AIR TURBINE AND BLAST FURNACE

Rudolf Ruegg, Zurich, Switzerland, assignor to Aktiengesellschaft Fuer Technische Studien, Zurich, Switzerland, a corporation of Switzerland Application March 9, 1944, Serial No. 525,786
In Switzerland May 3, 1943

3 Claims. (Cl. 60—2)

This invention relates to an air heater for heating both air required in a consumer of hot air as also air serving as working medium for a thermal power plant in which it describes, at least for the greater part, a closed circuit. As consumers of hot air, blast furnaces may be mentioned as an example.

The air flowing back to the air heater in a thermal power plant of the kind herein referred to usually still has a temperature of 300 to 400° C. In view of this, for the combustion air required for the air heater of the power plant pre-heaters are usually provided in order to further utilize the heat still contained in the flue gases issuing from the off-take of the air heater. However, in spite of this the flue gas temperatures are often still much too high, especially when fuels having a relatively small calorific value are burnt.

In order to ensure in an air heater of the kind referred to both low flue gas temperatures as also a high efficiency of the air heater as a whole, heating of the air to be consumed outside the power plant is, according to the present invention, effected at least partly in a heating system disposed within a range of flue gas temperatures which are lower than those acting on the heating system traversed by the air describing the closed circuit of the thermal power plant. The heating system in which is to be heated the air required for external consumption is preferably subdivided into two sets arranged in series, one of these sets being disposed in the range of minimum flue gas temperatures and the other within the range of maximum flue gas temperatures. The system for heating the air describing the circuit of the thermal power plant can then be arranged between the two sets above referred to.

The accompanying drawings show by way of example and in a simplified mode of representation preferred embodiments of air heaters according to the invention. In these drawings.

Figure 1:
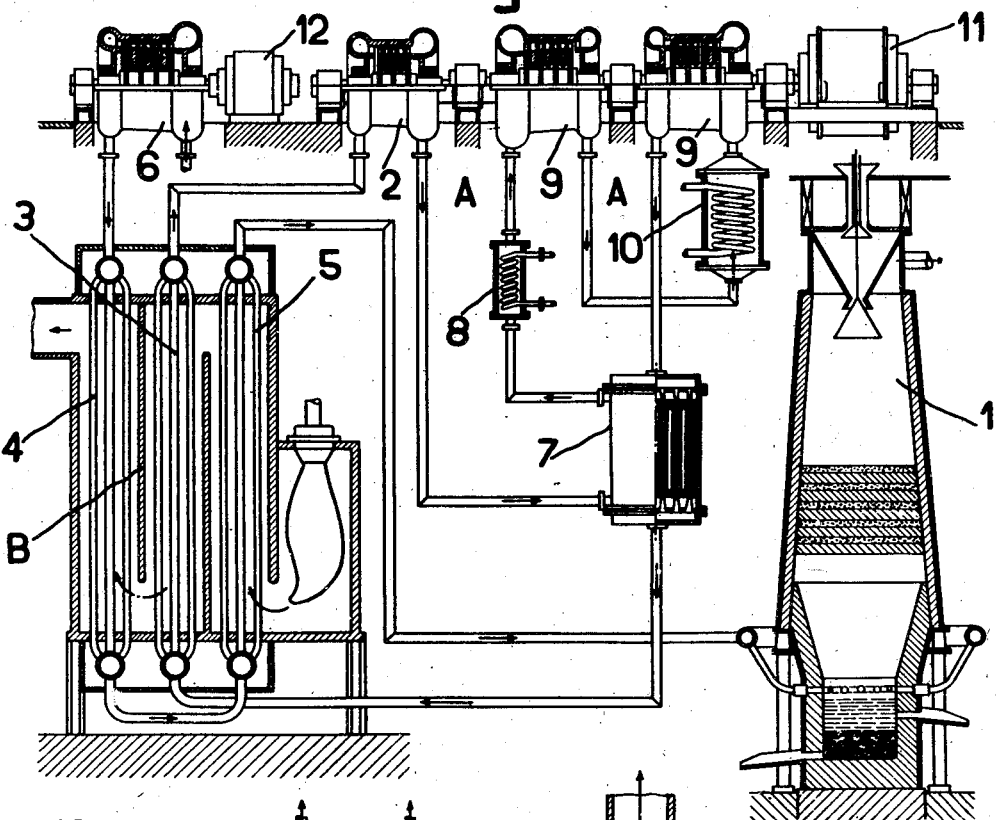
Fig. 1 shows an air heater with two systems for heating air to be consumed in a blast-furnace and with a further heating system arranged between said two systems and serving to heat the air required as working medium in a thermal power plant.

In Fig. 1 the numeral 1 denotes a blast furnace and A a thermal power plant in which hot air, used as working medium, describes a closed circuit. The thermal power plant comprises a turbine 2 to which is supplied hot air from a heating system 3. The latter forms part of an air heater B comprising two further heating systems 4 and 5. The heating system 3 is arranged between the heating systems 4 and 5 connected in series. The heating systems 4 and 5 serve for heating air required in the blast furnace 1, which is inhaled by a blower 6 and delivered into said two heating systems 4 and 5.

The expanded air issuing from the turbine 2 passes consecutively through a heat exchanger 7, a pre-cooler 8 and hereupon through a two-casing compressor 9 driven by the turbine 2 and provided with an intermediate cooler 10, said compressor 9 raising the circulating air again to a higher pressure. This part of the air, which has been compressed, passes through the heat exchanger 7 where it takes up heat from the expanded part of the air issuing from turbine 2. The part of the air, which in this way has again been brought to a higher temperature, finally traverses the heating system 3 where it is heated to the temperature required at the inlet of turbine 2.

For the sake of completeness it may also be mentioned that the numeral 11 denotes the receiver of useful output designed as a generator and driven by the turbine 2, whilst the numeral 12 denotes a motor driving the blower 6.

The air heater B thus serves both for heating the hot air required in the blast furnace 1 as also for heating the air describing the closed circuit of the thermal power plant A. In that part of the air heater B where the lowest flue gas temperature prevails, the heating system 4 is arranged in which the air issuing from blower 6 and required for the blast furnace 1 is to be heated to a given extent. In the middle heating system 3 the air for the aerodynamic turbine 2 is heated, whilst in the heating system 5, where the highest flue gas temperature prevails, the blast-furnace air is heated to its final temperature. The arrangement of the heating system 3 between the heating systems 4 and 5 has the advantage that in the first place the flue gases can be cooled down to a considerable degree, and secondly only a relatively small internal pressure prevails in the heating system 5 which is subject to the highest flue gas temperatures, since the air required for the blast furnace 1 has, as is well known, only to be raised to a pressure of a few atmospheres. Thus, in the heating system 5 high wall temperatures are admissible in view of the small internal pressure existing therein.

Figure 2:
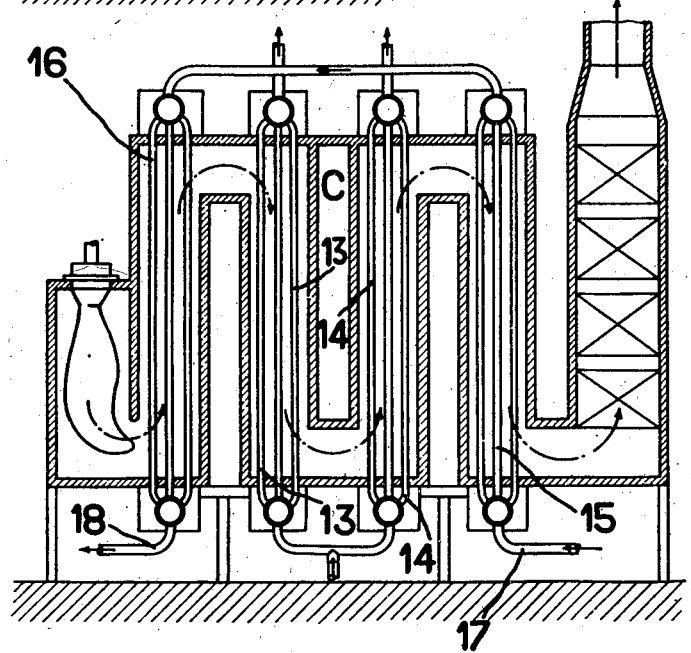
Fig. 2 shows an air heater with two heating systems for heating blast-furnace air and with two further systems arranged between said first mentioned two systems and serving to heat the air to be used as working medium in a thermal power plant.

The embodiment shown in Fig. 2 differs from the one described only in as far as the heating system for the air which describes the circuit of the thermal power plant comprises two sets 13 and 14. These two sets 13 and 14 are, with respect to the direction of flow of the combustion gases passing through the air heater C, likewise arranged between the heating systems 15 and 16, in which the blast-furnace air supplied through pipe 17 and discharged through pipe 18 is heated to the required final temperature. As regards the air which has to be heated, the two sets 13 and 14 are arranged in parallel.

The heat transmission in the heating systems can be effected by counterflow or concurrent flow. As shown in Fig. 1, in the heating system 5 exposed to the highest flue gas temperatures, the transfer is preferably effected by concurrent flow and in the heating system 4 exposed to the lowest flue gas temperature by counterflow.

What is claimed is:

1. The combination of a combustion chamber; a burner for producing combustion therein; means forming an offtake passage for combustion products leading from said chambers; two surface heat exchangers positioned in said passage so as to be contacted successively by off-flowing products of combustion, the first being adjacent the combustion chamber and the second near the discharge end of said passage; means for passing air to be heated at a relatively low pressure, first through the second, then through the first of said exchangers, and then to a consumer of hot air; and a thermal power plant of the type in which a gaseous working medium flows in a closed circuit comprising a turbo-compressor in which the medium is raised to a higher pressure, a surface heater in which said medium is next heated while at said higher pressure, and a turbine through which the compressed and heated medium expands, the surface heater of the power plant being interposed in said offtake passage between said first and second surface heat exchangers whereby it is subjected to a controlled temperature range safe for the pressure of the working medium passing therethrough.

2. The combination defined in claim 1 in which the first of said heat exchangers is arranged for concurrent flow and the second for counter flow of the air with respect to products of combustion.

3. The combination defined in claim 1 in which the heater forming part of the power plant is divided into two parts contacted serially by the flue gases, and the working medium flows through the two parts in parallel.

RUDOLF RUEGG.

REFERENCES CITED

The following references are of record in the file of this patent:

UNITED STATES PATENTS

| Number | Name | Date |
|---|---|---|
| 1,780,300 | Jacobus et al. | Nov. 4, 1930 |
| 1,884,777 | Lucke | Oct. 25, 1932 |
| 1,993,585 | Baumann et al. | Mar. 5, 1935 |

FOREIGN PATENTS

| Number | Country | Date |
|---|---|---|
| 126,940 | Great Britain | Aug. 12, 1920 |
| 202,325 | Switzerland | May 16, 1939 |
| 215,485 | Switzerland | Oct. 1, 1941 |
| 301,900 | Germany | Nov. 9, 1917 |
| 627,514 | Germany | Mar. 17, 1936 |